United States Patent [19]

Tiegel

[11] Patent Number: 4,478,919
[45] Date of Patent: Oct. 23, 1984

[54] SIDE TERMINAL LEAD ALLOY PRODUCT AND PROCESS

[75] Inventor: Ralph G. Tiegel, San Carlos, Calif.

[73] Assignee: Tiegel Manufacturing Company, Belmont, Calif.

[21] Appl. No.: 480,936

[22] Filed: Mar. 31, 1983

Related U.S. Application Data

[62] Division of Ser. No. 319,919, Nov. 10, 1981, Pat. No. 4,424,854.

[51] Int. Cl.$^3$ .............................................. H01M 2/30
[52] U.S. Cl. ..................................... 429/179; 420/572
[58] Field of Search ....................... 429/179, 178, 245; 420/573, 572, 574, 563

[56] References Cited

U.S. PATENT DOCUMENTS

| | | | |
|---|---|---|---|
| 148,795 | 3/1874 | Wood | 420/573 |
| 682,330 | 9/1901 | Leyendecker | 420/573 X |
| 897,953 | 9/1908 | Allen | 429/574 |
| 3,303,056 | 2/1967 | Sabatino et al. | 429/179 |
| 3,457,118 | 7/1969 | Miller | 429/179 |
| 3,607,441 | 9/1971 | Mix | 29/623.1 |
| 3,849,203 | 11/1974 | Hollis et al. | 228/112 |
| 3,874,933 | 4/1975 | Mocas | 164/119 |
| 4,146,771 | 3/1979 | Tiegel | 219/78.16 |
| 4,150,202 | 4/1979 | Tiegel | 429/179 |
| 4,317,871 | 3/1982 | Wolf et al. | 429/179 |

FOREIGN PATENT DOCUMENTS 2233510  1/1974  Fed. Rep. of Germany.

Primary Examiner—Anthony Skapars
Attorney, Agent, or Firm—Benasutti and Murray

[57] ABSTRACT

A side terminal lead alloy is provided which is a composition of lead, 3 wt-% antimony and 10 wt-% brass. The alloy is capable of use in conjunction with resistance welding techniques. The terminal created thereby exhibits sufficient structural integrity to permit a mechanical connection to be made directly thereto without any additional threaded inserts and exhibits sufficient electrical current conductivity to permit direct electrical connection thereto.

6 Claims, 2 Drawing Figures

SIDE TERMINAL LEAD ALLOY PRODUCT AND PROCESS

This is a divisional of application Ser. No. 319,919, filed Nov. 10, 1981, now U.S. Pat. No. 4,424,854.

BACKGROUND OF THE INVENTION

The present invention relates to a side terminal for use in conjunction with electrical storage batteries, and in particular relates to an alloy for the formation of such a side terminal.

Side terminal-type batteries generally include a battery case which has thereinside a plurality of individual cells which are separated by a series of partition walls. These cells are adapted to contain a plurality of battery elements therein. The battery elements are connected to each other in series by either connection through the partition walls or over the top of the walls. The endmost battery elements (i.e., the elements in the two end cells) are further connected to terminals which extend through the sidewall of the battery case. To use the battery, electrical connections are made with the battery terminals by positioning a cable connector against marginal portions of the terminal. Generally, the terminal has a threaded opening in the center thereof and the cable connector is retained in place against the terminal by using a bolt or similar threaded device which extends through the cable connector and engages the threaded portion of the terminal.

For convenience in construction, the side terminals usually become part of the battery case prior to the assembly of the various internal components which comprise the battery. To ensure a proper seal between the terminal and the battery case, the terminal is often directly cast within a cavity formed as part of the exterior surface of the battery case. Other times, the terminal is formed outside the case and later inserted into the cavity.

However the terminal is positioned in this cavity, it must be readily connectable to the end battery elements contained within the case. Oftentimes, resistance welding techniques are used to make this connection between the terminal and the battery elements. Therefore, the material for the terminal must be suitably selected with possible resistance welding in mind. In addition to considering a material suitable for resistance welding, the material must also be able to afford proper electrical connection between the battery element and the cable connector which will be connected to the terminal. These requirements necessitate that the terminal material exhibit sufficient conductivity for proper electrical performance and sufficient structural integrity to ensure a proper mechanical connection with the cable connector.

Because of these important requirements, prior workers in this art generally have been constrained to using side terminals formed only of lead, or a lead-antimony alloy, in combination with a threaded insert, such as a steel nut. The use of lead or the lead-antimony alloy helps to insure proper electrical performance, while the casting of the steel nut within the terminal helps to insure proper mechanical performance.

The actual conduction of electrical current takes place along the marginal portions of the terminal which directly contact the cable connector. Current flows does not proceed through the steel nut, which generally exhibits a substantial resistance. Therefore, the use of these steel nut inserts in addition to limiting current conductivity also prevents unnecessary limitations regarding cost and castability. Although the inserts are satisfactory for their purpose, it has become desirable to eliminate the need for such steel inserts.

SUMMARY OF THE INVENTION

In light of the old side terminal formations as discussed above, it is a primary objective of the present invention provide a side terminal for an electric storage battery which eliminates the necessity of providing an internally threaded steel nut insert within the side terminal.

Furthermore, it is also an object of this invention to provide a new lead alloy material for a side terminal formation which will afford proper electrical performance (i.e., good conductivity and low resistivity) while at the same time affording good mechanical performance for receiving the electrical connector.

Still further, it is an object of the invention to provide a lead alloy for a side terminal which is suitable for electrical resistance welding, so that the terminal can be easily connected to the battery element.

These objects of the present invention are fulfilled by providing a terminal material which is an alloy of lead, brass and antimony in the following weight percentages: 10% brass, 3% antimony, and the remainder lead and standard impurities.

BRIEF DESCRIPTION OF THE FORMAL DRAWINGS

Further objects and a better understanding of the present invention will become apparent from the following detailed description taken in consideration with the formal drawings, wherein:

FIG. 1 is a perspective view of a battery container having side terminals extending through the sidewall thereof; and FIG. 2 is an enlarged cross-section view taken along line 2—2 of FIG. 1 showing the side terminal of the present invention contained within the side terminal cavity.

DETAILED DESCRIPTION OF THE INVENTION

Figure 1:
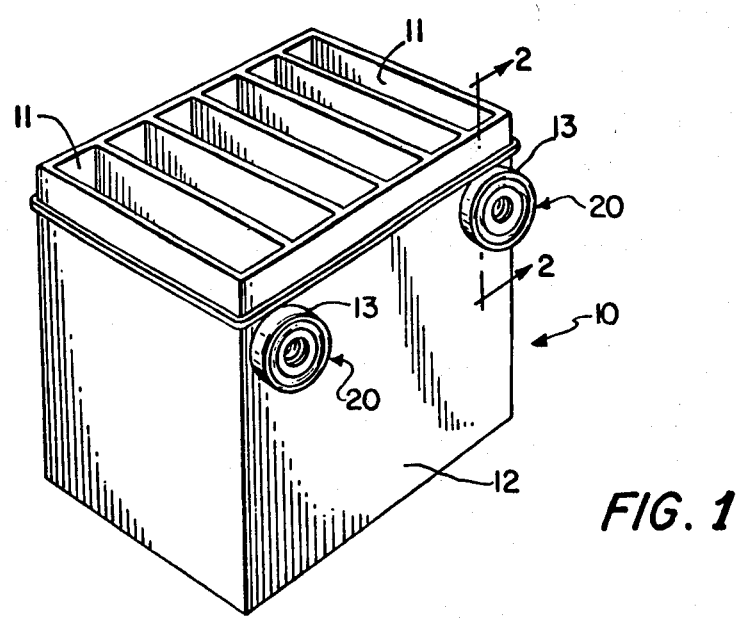

Although specific forms of the invention have been selected for illustration in the drawings, and the following description is drawn in specific terms for the purpose of describing these forms of the invention, this description is not intended to limit the scope of the invention which is defined in the appended claims.

Figure 2:
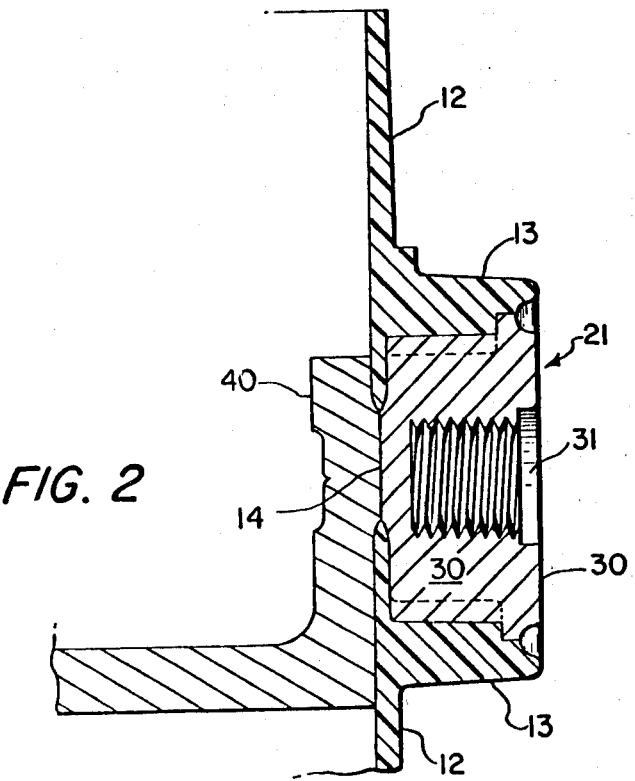

FIG. 1 shows a battery container 10 which has a plurality of cells compartments 11 and two side terminals 20 on one sidewall 12 thereof. As may be seen more clearly in FIG. 2, a terminal cavity 21 is created by a circular projection 13 formed with and extending from the sidewall 12. An opening 14 is provided through the sidewall 12 at the base of the terminal cavity 21. A lead alloy terminal insert 30 is provided in the terminal cavity 21, and this terminal insert has a threaded core 31 for receiving a bolt for tightening a terminal connector (not shown) to the terminal insert. Unlike prior art lead or lead antimony terminal inserts which require an internally threaded steel nut or similar device to be contained within the terminal insert to receive the bolt connecting the terminal connector, the present invention eliminates this need.

The present invention comprises a new alloy for a side terminal insert which has essentially the following composition: 10 wt-% brass; 3 wt-% antimony; and remainder lead and standard lead impurities.

It has been found that by providing a lead alloy of this composition that a side terminal can be created which has sufficient mechanical properties to obviate the necessity for the steel nut insert and which has sufficiently excellent current conductivity to permit a direct electrical connection to be made between the terminal and an electrical conductor connected thereto.

This alloy can, be cast into the appropriate terminal configuration and then inserted into the terminal cavity for connection to the battery element. However, it is also a consideration of this invention that it may be cast in place directly in the terminal cavity 21 to produce the terminal insert. The alloy is also well adapted to facilitate the various available techniques for connecting the terminal insert to the battery element 40 within a cell through the opening 14. One such technique is known as electrical resistance welding.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

I claim:

1. A side terminal battery case comprising:
   (a) a battery casing having at least one side terminal cavity on at least one side wall thereof; and
   (b) a one-piece terminal member having a threaded opening therein within said terminal cavity, said terminal member being of a lead alloy comprising:
      (a) 10 wt-% brass;
      (b) 3 wt-% antimony; and
      (c) the remainder lead.

2. An alloy for integrally casting a unitary terminal of an electric storage battery, said alloy comprising:
   (a) 10 wt-% brass;
   (b) 3 wt-% antimony; and
   (c) the remainder lead.

3. A one piece lead alloy side terminal for a storage battery container having at least one terminal cavity on a side wall thereof and projecting therefrom and at least one opening positioned within said terminal cavity and through said side wall, said side terminal comprising:
   an integrally cast terminal of (a) 10 wt-% brass; (b) 3 wt-% antimony; and (c) the remainder lead, and dimensioned to fit within said terminal cavity, said terminal having a first portion dimensioned to complement said opening and a second portion, opposite and extending away from said first portion, having a threaded core extending inwardly toward said first portion.

4. A side terminal of claim 3, wherein said side terminal is a cast one piece terminal.

5. An improved integrally cast unitary electric storage battery terminal having a cast threaded opening therein, the improvement characterized by said terminal being comprised of a lead alloy comprised of:
   (a) 10 weight-% brass;
   (b) 3 weight-% antimony; and
   (c) the remainder lead.

6. An improved alloy for integrally casting a unitary terminal insert having a threaded opening therein, said alloy comprising:
   (a) 10 weight-% brass;
   (b) 3 weight-% antimony; and
   (c) the remainder lead.

* * * * *